(12) United States Patent
Yamamoto et al.

(10) Patent No.: US 7,408,325 B2
(45) Date of Patent: Aug. 5, 2008

(54) BATTERY CHARGING METHOD

(75) Inventors: Hiroyoshi Yamamoto, Sumoto (JP); Masao Yamaguchi, Sumoto (JP); Mikitaka Tamai, Tsuna-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 392 days.

(21) Appl. No.: 11/007,172

(22) Filed: Dec. 9, 2004

(65) Prior Publication Data
US 2005/0127873 A1    Jun. 16, 2005

(30) Foreign Application Priority Data
Dec. 11, 2003  (JP)  ............... 2003-413965

(51) Int. Cl.
*H02J 7/00*    (2006.01)
(52) U.S. Cl. .............. 320/133; 320/118; 320/128; 320/135
(58) Field of Classification Search ........... 320/128, 320/118, 122, 135, 133
See application file for complete search history.

(56) References Cited

U.S. PATENT DOCUMENTS

| | | |
|---|---|---|
| 5,602,481 A | 2/1997 | Fukuyama |
| 5,850,136 A * | 12/1998 | Kaneko ................ 320/119 |
| 2002/0195994 A1 | 12/2002 | Perelle |

FOREIGN PATENT DOCUMENTS

| | | |
|---|---|---|
| EP | 1 014 532 | 6/2000 |
| GB | 2 313 497 | 11/1997 |
| JP | 5-49181 | 2/1993 |

\* cited by examiner

Primary Examiner—Gary L Laxton
Assistant Examiner—Yalkew Fantu
(74) Attorney, Agent, or Firm—Wenderoth, Lind & Ponack, L.L.P.

(57) ABSTRACT

A battery charging method that detects the voltage of each series-connected battery, discharges batteries with voltage exceeding a prescribed voltage, and charges a plurality of batteries while maintaining cell balance. This charging method detects the voltage of each battery being charged and if any battery voltage exceeds the prescribed voltage, only the battery that exceeds the prescribed voltage is discharged, after a specified charging time, until its voltage drops to the prescribed voltage. Batteries that do not exceed the prescribed voltage are not discharged, and thereby all batteries are charged while balancing their voltages.

10 Claims, 4 Drawing Sheets

BATTERY CHARGING METHOD

BACKGROUND OF THE INVENTION

This invention relates to a method of charging batteries connected in series, and in particular to a method which charges while balancing the voltage of each battery.

Battery packs with a plurality of batteries connected in series are used in various applications. In particular, since output voltage can be increased by increasing the number of batteries connected in series, this type of battery pack is suitable for applications requiring large output. However, when many series-connected batteries are charged, they gradually become unbalanced even though the same current flows in all batteries. This is because electrical characteristics and environmental conditions during charging and discharging cannot be maintained uniformly over all batteries (e.g. temperature variation). There is a strong tendency for a battery, which has reduced capacity, to over-charge or over-discharge relative to other batteries when connected in series. This is directly related to an observable reduction in total capacity of a series-connected battery pack.

To eliminate this drawback, a method was developed which connects discharge circuits for the series connected batteries and balances battery voltage via these discharge circuits (See, for example Japanese Patent Application HEI 5-49181).

SUMMARY OF THE INVENTION

A charging circuit which includes a voltage balancing circuit, cited in the prior art disclosure above, is shown in FIG. 1. As shown in FIG. 1, power is supplied from a separately provided power supply (not illustrated) to the + (positive) and − (negative) battery output terminals, and discharge circuits are connected in parallel with each of the series-connected batteries of the battery pack. A discharge circuit comprises a discharge resistor and switching device connected in series. The switching device of a discharge circuit turns ON to discharge the connected battery through the discharge resistor. The switching device is controlled ON and OFF by output from a comparator which compares battery voltage with a prescribed voltage. The comparator is given hysteresis to prevent chattering of the switching device. Specifically, a second specified voltage to turn a switching device OFF is set considerably lower than a first specified voltage which turns the switching device ON.

In this charging circuit, which includes a voltage balancing circuit, if the voltage of any battery becomes greater than the first specified voltage, the comparator connected to that battery will turn ON its switching device. Comparators connected to batteries with voltage not exceeding the first specified voltage do not turn ON their switching devices, which are in the OFF state. If any switching device is turned ON, charging is suspended. In this state, the switching device which was turned ON discharges its associated battery via the discharge resistor. Discharge circuits with switching devices which were not turned ON do not discharge their associated batteries. Voltage gradually decreases for a battery which discharges through its switching device and discharge resistor. When the voltage of the discharging battery drops below the second specified voltage, the switching device is switched from ON to OFF and discharge is suspended. When discharge is suspended, charging is started again and all series-connected batteries are charged.

The above operations are repeated to charge all batteries to full charge while balancing the voltages of each of the batteries. However, when batteries are charged by the method described above, there is a drawback that the voltages of all batteries cannot be uniformly aligned. This is because the comparators are provided with hysteresis. Specifically, during charging a battery with voltage that rises above the first specified voltage is discharged to the second specified voltage and attains a fixed voltage. However, since batteries with voltages that are above the second specified voltage but do not rise above the first specified voltage are not discharged, they attain voltages between the first and second specified voltages. Namely, voltages of batteries discharged by their discharge circuits attain a common constant value, but voltages of batteries which were not discharged attain values somewhere between the first and second specified voltage. As a result, voltages of those batteries which were not discharged remain with a maximum voltage difference just equal to the hysteresis voltage difference, and this method has the drawback that the voltages of all batteries cannot be equally balanced.

The present invention was developed to solve this type of drawback. Thus it is a primary object of the present invention to provide a battery charging method which can charge in an ideal balanced manner in which the voltages of all batteries uniformly attain a common voltage.

The above and further objects and features of the invention will more fully be apparent from the following detailed description with accompanying drawings.

The battery charging method of the present invention is a method which charges a plurality of rechargeable batteries connected in series. This battery charging method detects the voltage of each battery, and discharges batteries with voltages exceeding a prescribed voltage to charge the plurality of batteries while maintaining balance between battery cells. This battery charging method detects the voltage of each battery being charged. When the voltage of any battery exceeds the prescribed voltage, charging is subsequently performed for a specified time. After charging for this specified time, batteries with voltage not exceeding the prescribed voltage are not discharged, while only those batteries with voltage exceeding the prescribed voltage are discharged until their voltage drops to the prescribed voltage. This charges the plurality of batteries while balancing the voltages of each battery.

The charging method described above has the characteristic that it can charge in an ideal balanced manner resulting in the voltage of each battery uniformly attaining a common voltage. This is because the charging method above does not have voltage hysteresis. Rather, after charging a battery with voltage exceeding the prescribed voltage for a specified time, that battery is discharged. When the voltage of that discharging battery drops to the prescribed voltage, discharge is suspended to balance battery voltages. Since charging by this method makes the voltage of each battery converge to the prescribed voltage, each battery is fully charged while eliminating voltage imbalance.

In addition, the battery charging method of the present invention can detect the voltage of each battery, and when the voltage of any battery exceeds the prescribed voltage, even after a delay time has elapsed, charging is performed for a specified time. After charging for the specified time, batteries with voltage not exceeding the prescribed voltage are not discharged, while only those batteries with voltage exceeding the prescribed voltage are discharged until their voltage drops to the prescribed voltage allowing voltage balancing.

In the charging method described above, a delay time is provided to determine whether any battery voltage has exceeded the prescribed voltage. If battery voltage still exceeds the prescribed voltage even after the delay time has elapsed, then the voltage of that battery is judged to exceed the prescribed voltage.

Therefore, this method has the characteristic that detection error due to transient voltage rise can be effectively prevented and voltage rise can be accurately detected.

Further, when a battery with voltage exceeding the prescribed voltage is discharged in the charging method of the present invention, charging of all batteries can be suspended. The batteries can be lithium ion batteries.

Still further, the charging method of the present invention has a discharge circuit, which is a discharge resistor and switching device, connected in parallel with each battery. When the voltage of any battery exceeds the prescribed voltage, the discharge circuit switching device connected in parallel with that battery can be turned ON, and part of the charging current can be bypassed.

DETAILED DESCRIPTION OF THE INVENTION

Figure 1:
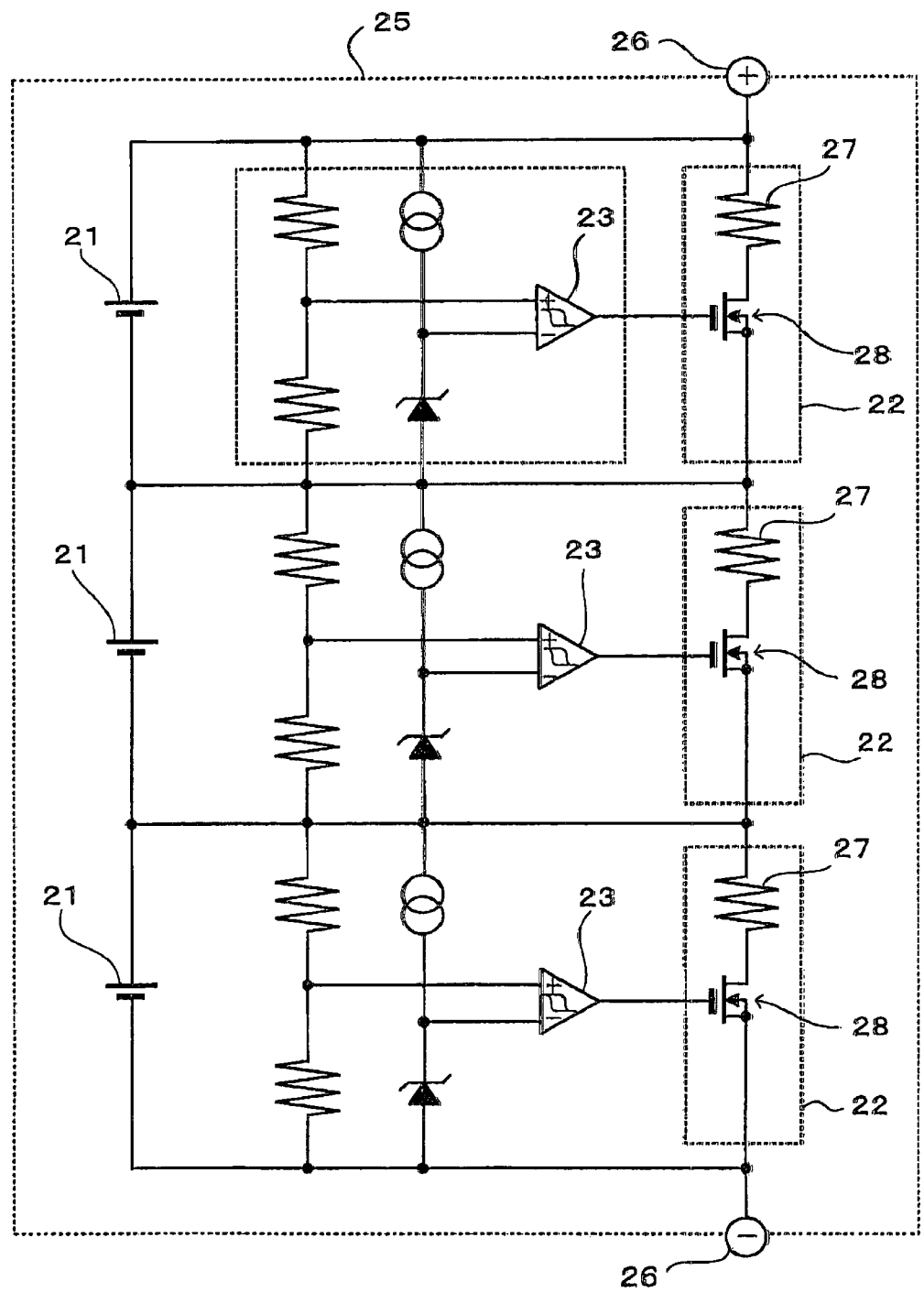
FIG. 1 is a circuit diagram showing an example of a charging circuit including a voltage balancing circuit used in a prior art charging method.
Figure 2:
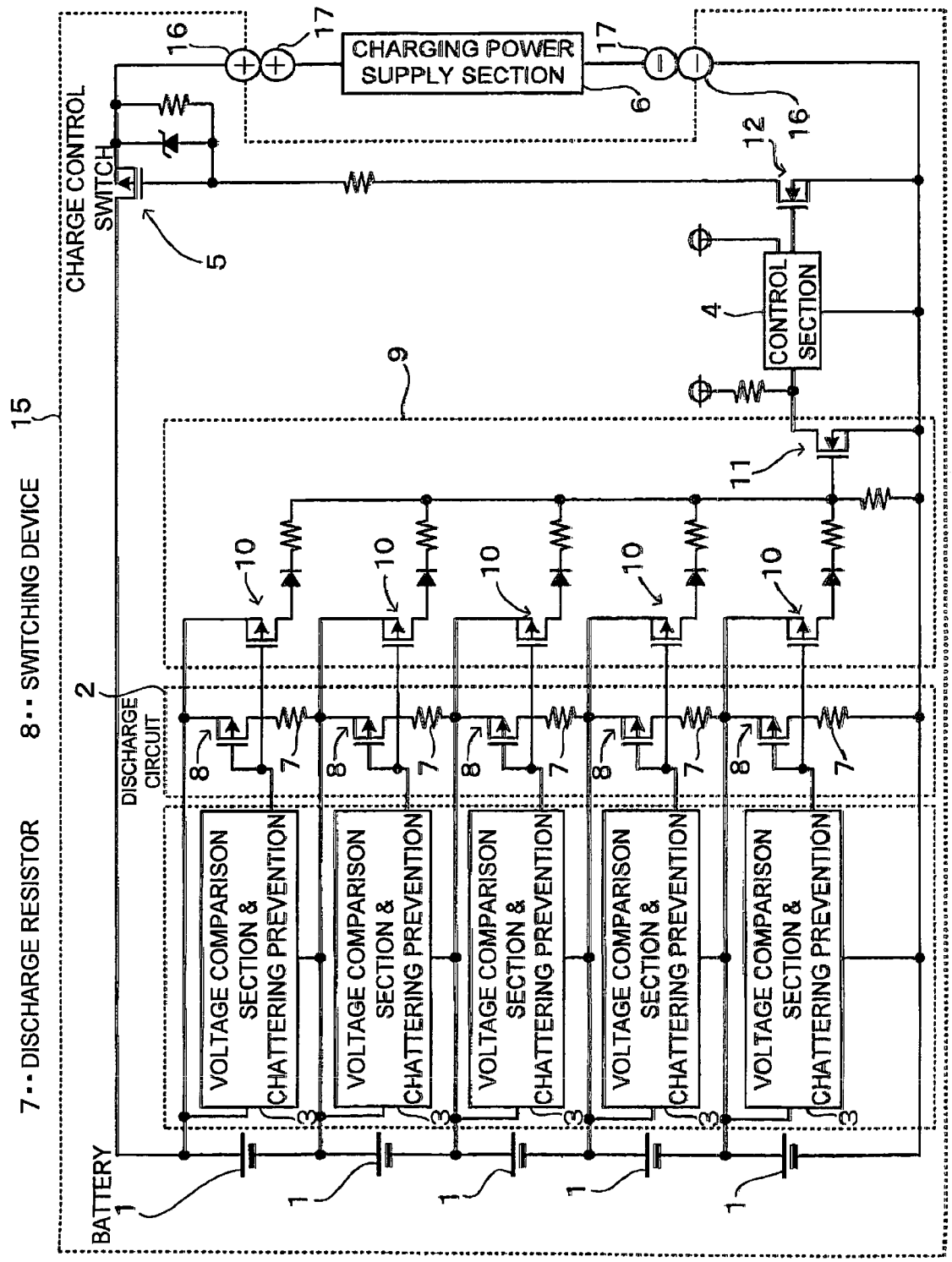
FIG. 2 is a circuit diagram showing an example of a charging circuit including a voltage balancing circuit used in an embodiment of the charging method of the present invention.

FIG. 2 shows a charging circuit including a voltage balancing circuit used in the charging method of the present invention. This charging circuit including voltage balancing is housed in a battery pack 15. The charging circuit with voltage balancing charges a plurality of rechargeable batteries 1 connected in series. The rechargeable batteries 1 are lithium ion batteries. However, the rechargeable batteries can be any batteries that can be recharged, such as nickel hydrogen batteries or nickel cadmium batteries instead of lithium ion batteries.

The battery pack 15 attaches to a charging power supply section 6 in a detachable manner with its positive and negative battery output terminals 16 in electrical contact with positive and negative charging terminals 17 of the charging power supply section 6. Alternatively, instead of the detachable battery pack arrangement, it can also be configured as a battery pack internal to a piece of electrical equipment (not illustrated). In that case, the battery pack can be electrically disconnected from the charging power supply section allowing it to supply power to the electrical equipment.

The charging circuit of FIG. 2, which includes a voltage balancing circuit, is provided with a discharge circuit 2 connected in parallel with the rechargeable batteries 1, voltage comparison sections 3 to control elements of each discharge circuit 2 ON and OFF, a control section 4 to control a charge control switch 5 ON and OFF based on output from the voltage comparison sections 3, a charge control switch 5 that is switched ON and OFF by the control section 4 to control charging and discharging of the batteries 1, and a charging power supply section 6 that is connected to the batteries 1 via the charge control switch 5.

A discharge circuit element has a discharge resistor 7 and a switching device 8 connected in series. Here, the discharge circuit 2 of FIG. 2 has five elements corresponding to the five battery cells 1. In a discharge circuit element, the switching device 8 is turned ON to discharge its associated battery 1. The battery 1 is not discharged when the switching device 8 is in the OFF state. Discharge current of a discharge circuit 2 is set by the value of the discharge resistor 7. The current for discharging a battery 1 is set smaller than the current for charging. When the discharge resistor 7 sets battery discharging current less than the charging current, the battery 1 can be charged by the total current when a discharge circuit switching device 8 is ON during charging. The switching device 8 of a discharge circuit 2 is switched ON or OFF to discharge the battery 1, or to suspend discharging by a signal input from the voltage comparison section 3. If a voltage-rise signal is input to the discharge circuit 2 from a voltage comparison section 3, a switching device 8 is turned ON to discharge the battery 1. If a voltage-drop signal is input to the discharge circuit 2 from a voltage comparison section 3, a switching device 8 is turned OFF to suspend discharging of the battery 1.

Figure 3:
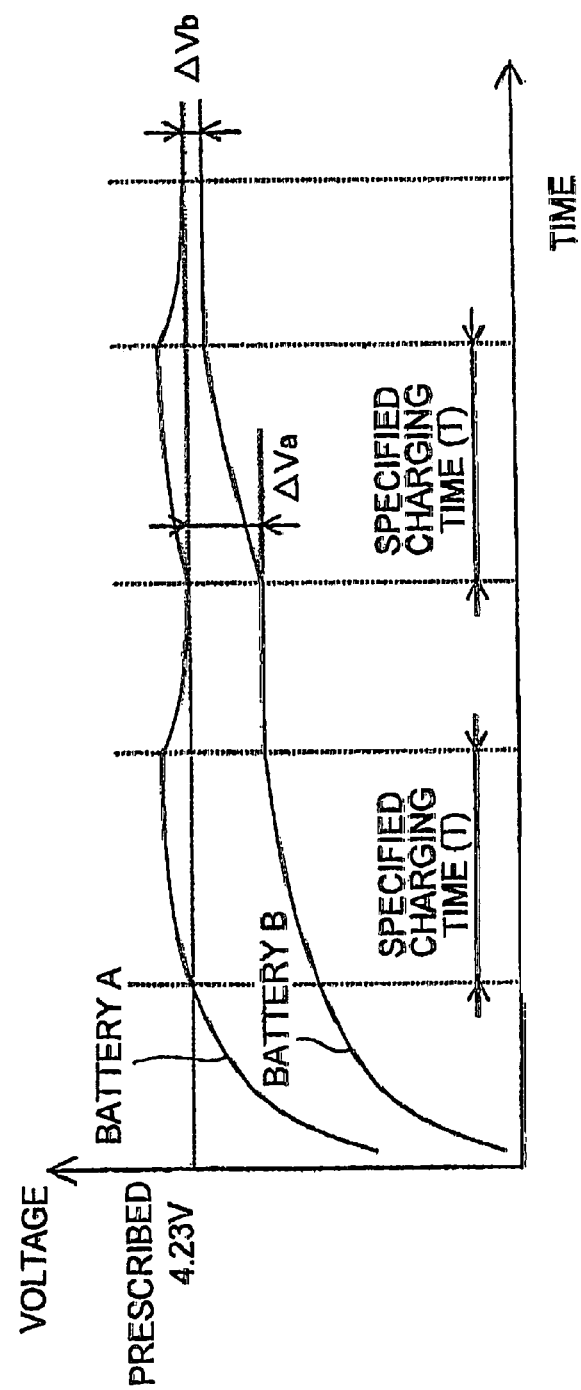
FIG. 3 is a graph showing battery voltage characteristics of batteries being charged by an embodiment of the charging method of the present invention.

Each voltage comparison section 3 is provided with a comparison circuit (not illustrated) which compares battery voltage with a prescribed voltage, and a delay circuit (not illustrated) which prevents chattering of the switching device 8 due to factors such as noise induced false detection by the comparison circuit. The comparison circuit is a comparator which compares battery voltage to the prescribed voltage. The comparator has its input on one side connected to a reference voltage, and its input on the other side connected to the battery voltage. When the reference voltage is input to the non-inverting input and the battery voltage is input to the inverting input of the comparator, a LOW voltage-rise output signal results from battery voltage rising above the prescribed voltage, and a HIGH voltage-drop output signal results from battery voltage dropping below the prescribed voltage. If the reference voltage and battery voltage inputs are reversed, the complement of the LOW and HIGH outputs are obtained. The reference voltage connected to the comparator is the prescribed voltage. FIG. 3 shows voltage characteristics during charging for lithium ion batteries 1, and for an example, the prescribed voltage is set at 4.23V. In a voltage comparison section 3 with a LOW voltage-rise signal, LOW is output when battery 1 voltage is greater than the prescribed voltage, and HIGH is output when battery 1 voltage is less than the prescribed voltage.

The voltage comparison circuit of a voltage comparison section 3 outputs a voltage-rise signal only after a time longer than the delay time of the delay circuit. Namely, a voltage-rise signal is issued only when battery voltage is still greater than the prescribed voltage even after the set delay time of the delay circuit has elapsed. If the time that battery voltage exceeds the prescribed voltage is less than the delay time of the delay circuit, a voltage-rise signal is not output. A voltage comparison section 3 provided with a delay circuit can accurately detect battery voltage rise. This is because even though detected voltage may rise temporarily due to effects such as noise, battery voltage is not judged greater than the prescribed voltage. Consequently, the delay time of a voltage comparison section delay circuit is set to a time that will prevent improper operation and chattering of the switching device 8 due to effects such as noise. In the voltage characteristic graph of FIG. 3, delay times of delay circuits are not labeled because they are short.

The control section 4 controls the charge control switch 5 ON and OFF based on signals input from voltage comparison sections 3. The control section 4 is connected to the voltage comparison sections 3 via an input circuit 9. The input circuit 9 is provided with input FETs (field effect transistors) 10 connected to each voltage comparison section 3, and a buffer FET 11 connected to the output side of all the input FETs 10. The input side of each input FET 10, which is a gate, is connected to the output side of each voltage comparison section 3. The output side of each input FET 10, which is a drain, is connected via a diode and resistor to the input side of the buffer FET 11, which is its gate. If a voltage-rise signal, which is a LOW signal, is output from any of the voltage comparison sections 3, the gate of the buffer FET 11 of this input circuit 9 will become HIGH and the buffer FET 11 will be turned ON. If the buffer FET 11 is switched from OFF to ON, a LOW voltage-rise signal will be input to the control section 4. In the input circuit 9 of FIG. 2, when battery 1 voltage becomes greater than the prescribed voltage and a voltage comparison section 3 outputs a LOW voltage-rise signal, a LOW signal is input to the control section 4. However, the input circuit can also be designed with an inverter between the voltage comparison sections and the control section to input a HIGH signal to the control section when a voltage comparison section issues a LOW voltage-rise signal.

The control section 4 is provided with a timer (not illustrated). When a voltage-rise signal is input to the control section 4 from a voltage comparison section 3, the control section 4 does not immediately switch the charge control switch 5 from ON to OFF to suspend charging. Rather, the voltage-rise signal input from a voltage comparison section 3 starts a timer count. When the timer count has elapsed, the control section 4 switches the charge control switch 5 from ON to OFF to suspend all battery charging. Subsequently, when a voltage-drop signal is input from the voltage comparison section 3, the control section 4 switches the charge control switch 5 from OFF to ON to resume charging. With a voltage-drop signal, switching of the charge control switch 5 from OFF to ON is immediate.

As shown in FIG. 3, a specified charging time (T) is loaded in timer memory. This specified charging time (T) depends on charging current as well as other factors. To avoid overcharging when charging current is high, charging current, the number of batteries in parallel, and battery capacity are taken into consideration to set the specified charging time (T).

The charge control switch 5 is a FET, which is controlled ON and OFF by a signal input from the control section 4. However, other semiconductor switching devices can also be used as the charge control switch. The charge control switch 5 of FIG. 2 is connected to the control section 4 via a direct current control FET 12. In this circuit, when the control section 4 issues a HIGH output, the direct current control FET 12 is turned ON. When the direct current control FET 12 turns ON, the gate of the charge control switch FET drops close to ground and the charge control switch FET turns ON. When the control section 4 issues a LOW output, the charge control switch 5 turns OFF.

The charging power supply section 6 is a power supply which can input commercial alternating current power and output power at voltages and currents that can charge the series connected batteries 1.

The charging circuit described above, which includes a voltage balancing circuit, charges series connected batteries 1 as described below. The voltages of batteries 1 charged by the steps below vary as shown in FIG. 3. However, FIG. 3 shows voltage variation characteristics for two batteries A and B. Further, those two batteries A and B are assumed to have an initial voltage differential (voltage of battery A >voltage of battery B).

(1) The charge control switch 5 is turned ON and charging is commenced. Charging is performed on the series connected batteries A and B and their battery voltage rises.

(2) When the voltage of battery A exceeds the prescribed voltage of 4.23V, even after the delay time, the voltage comparison section 3 controlling battery A outputs a LOW voltage-rise signal. The voltage-rise signal output from the voltage comparison section 3 is input to the discharge circuit 2 and input circuit 9.

(3) The voltage-rise signal, which is input to the discharge circuit 2, turns ON the switching device 8 connected in parallel with battery A. The switching device 8, which was turned ON, connects a discharge resistor 7 in parallel with battery A, which has voltage exceeding the prescribed voltage. Since battery A is currently being charged, the discharge resistor bypasses charging current. Specifically, charging current for battery A is reduced by an amount corresponding to the current flow in the discharge resistor 7. Since the current flow in the discharge resistor 7 is less than the charging current, battery A is charged by a reduced net charging current. At this time, a discharge resistor 7 is not connected in parallel with battery B, which has voltage not exceeding the prescribed voltage. Therefore, battery B is charged with the entire charging current. As a result, battery A, which exceeded the prescribed voltage, is charged with less current than battery B, which did not exceed the prescribed voltage.

(4) The input circuit 9, which has input a voltage-rise signal, outputs a LOW voltage-rise signal to the control section 4. The control section 4, which has input the voltage-rise signal, starts the timer count, and charging is continued until the timer count elapses at the specified charging time (T). When the timer count elapses, the charge control switch 5 is switched from ON to OFF and charging is suspended.

At this point, since the discharge circuit 2 is ON for battery A, which exceeded the prescribed voltage, it is discharged and its voltage gradually decreases. Battery B, which did not exceed the prescribed voltage, is neither charged or discharged, and its voltage does not change. Namely, only the voltage of battery A decreases.

(5) When the voltage of discharging battery A gradually decreases and drops below the prescribed voltage, the voltage comparison section 3 issues a HIGH output as a voltage-drop signal.

(6) When the voltage-drop signal is output from the voltage comparison section 3, the discharge circuit 2 switching device 8 is switched from ON to OFF and discharge is suspended. In addition, this voltage-drop signal is input to the control section 4 via the input circuit 9. The control section 4, which inputs the voltage-drop signal, switches the charge control switch 5 from OFF to ON to resume charging.

Subsequently, when steps (2) through (6) are repeated, all battery voltages approach the prescribed voltage as the batteries 1 are fully charged. When all batteries 1 reach full charge, output from the charging power supply section 6 is turned OFF and charging is terminated.

Figure 4:
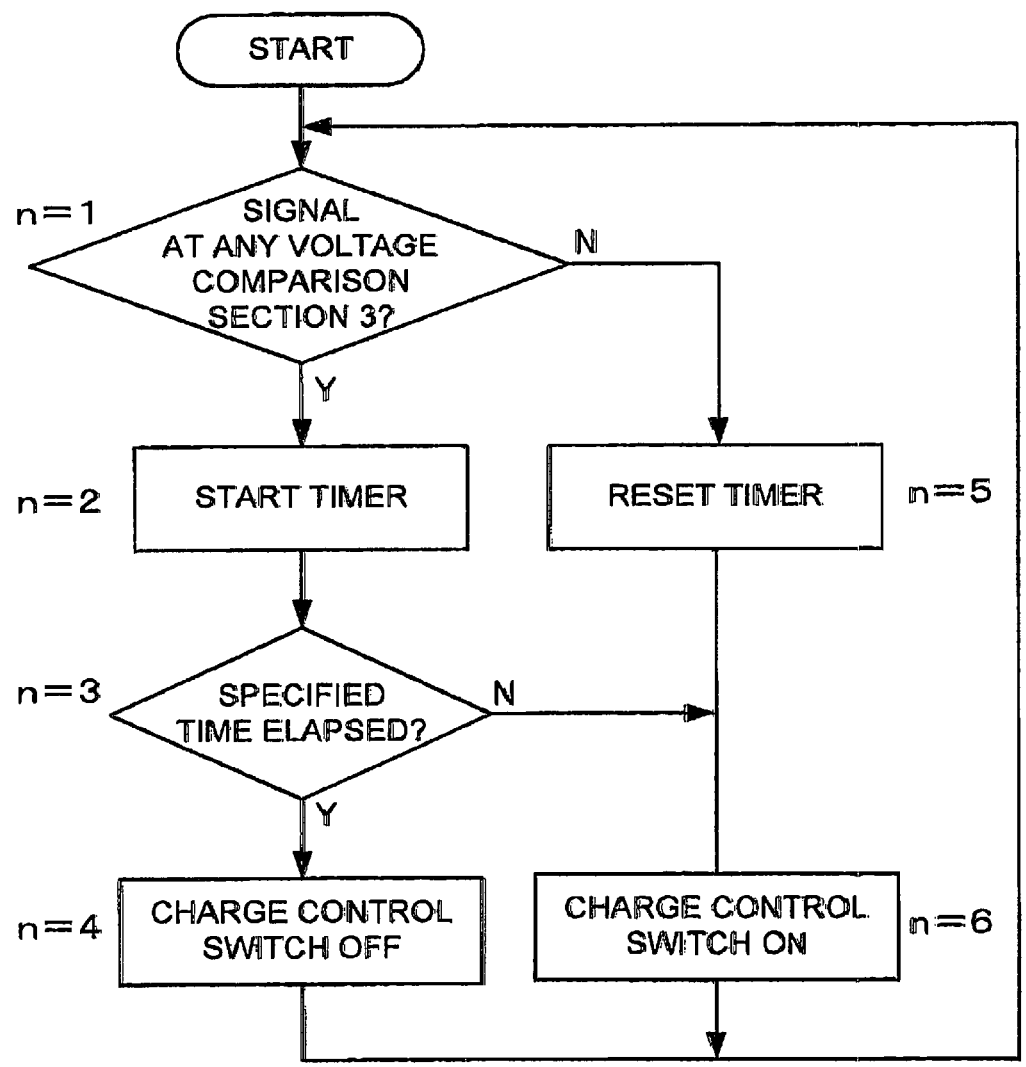
FIG. 4 is a flow-chart for charging batteries by an embodiment of the charging method of the present invention.

A flow-chart of the operation of the control section 4 to charge in the manner described above is shown in FIG. 4, and its description follows.

[step n=1]

At the voltage comparison sections 3, it is judged whether or not the voltage of any battery has reached the prescribed voltage.

[step n=2]

Battery voltage has reached the prescribed voltage, and timer counting is started.

[step n=3]

The counting timer is judged to determine if the specified charging time (T) has elapsed.

[step n=4]

The charge control switch 5 is turned OFF.

[step n=5]

The timer is reset.

[step n=6]

The charge control switch 5 is turned ON.

In the charging method described above, when the voltage of any battery 1 exceeds the prescribed voltage, charging is suspended after a specified charging time (charge capacity X), and only the battery that exceeded the prescribed voltage is discharged until its voltage drops below the prescribed voltage (discharge capacity Y). Consequently, batteries with lower voltage that did not exceed the prescribed voltage increased in capacity by charge capacity X, while the battery that exceeded the prescribed voltage had zero net change in capacity (charge capacity X=discharge capacity Y). Ultimately, the voltages of all batteries equalize at the prescribed voltage, and each battery can be charged while balancing battery voltages.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

This application is based on application No. 2003-413965 filed in Japan on Dec. 11, 2003, the content of which is incorporated hereinto by reference.

What is claimed is:

1. A battery charging method for charging a plurality of rechargeable batteries while maintaining cell balance, the method comprising:

charging the plurality of batteries, which are connected in series;

detecting the voltage of each of the batteries;

discharging any of the batteries that exceed a prescribed voltage, wherein, in the detecting operation, the voltage of each battery is detected, and if the voltage of any of the batteries exceeds the prescribed voltage, charging is performed for a specified charging time, subsequently only the battery that exceeds the prescribed voltage is discharged until its voltage drops to the prescribed voltage without discharging batteries that do not exceed the prescribed voltage, to maintain their voltage substantially constant, and thereby charging while balancing battery voltages.

2. A battery charging method as recited in claim 1 wherein charging of all batteries is suspended while the battery that exceeds the prescribed voltage is discharged.

3. A battery charging method as recited in claim 1 wherein if the voltage of any battery still exceeds the prescribed voltage even after a delay time has elapsed, charging is performed for a specified charging time, subsequently only the battery that exceeds the prescribed voltage is discharged until its voltage drops to the prescribed voltage without discharging batteries that do not exceed the prescribed voltage, and thereby charging while balancing battery voltages.

4. A battery charging method as recited in claim 3 wherein charging of all batteries is suspended while the battery that exceeds the prescribed voltage is discharged.

5. A battery charging method as recited in claim 1 wherein the batteries are lithium ion batteries.

6. A battery charging method as recited in claim 1 wherein discharge circuitry comprising a series connected discharge resistor and switching device is connected in parallel with each of the batteries; when the voltage of any of the batteries exceeds the prescribed voltage, the discharge circuit switching device connected in parallel with that battery is turned ON, and part of the charging current is bypassed through the discharge resistor.

7. A battery charging method as recited in claim 6 wherein discharge current for a discharge circuit switching device, which is turned ON, is less than the charging current; a battery that exceeds the prescribed voltage is charged with less current than batteries that do not exceed the prescribed voltage for the specified charging time; and subsequently only the battery that exceeds the prescribed voltage is discharged until it drops to the prescribed voltage without discharging batteries that do not exceed the prescribed voltage.

8. The battery charging method as recited in claim 2, wherein, while the discharge circuit is ON, each of the batteries that exceeds the prescribed voltage is discharged, and its voltage gradually decreases, and thus the voltage of the battery decreases, while another of the batteries, which does not exceed the prescribed voltage, remains at the same voltage.

9. The battery charging method as recited in claim 4, wherein, while the discharge circuit is ON, each of the batteries that exceeds the prescribed voltage is discharged, and its voltage gradually decreases, and thus the voltage of the battery decreases, while another of the batteries, which does not exceed the prescribed voltage, remains at the same voltage.

10. A battery charging method for charging a plurality of rechargeable batteries while maintaining cell balance, the method comprising:

charging the plurality of batteries, which are connected in series, wherein the charging operation is conducted until at least one of the batteries exceeds a prescribed voltage;

detecting the voltage of each of the batteries;

charging the batteries for a specified charging time after the prescribed voltage of the at least one battery has been detected, wherein a timer is used to count the specified charging time and thereby determine when the specified charging time has elapsed; and discharging, after the specified charging time has elapsed, the at least one battery that has exceeded the prescribed voltage, wherein only the battery that exceeded the prescribed voltage is discharged until its voltage drops to the prescribed voltage without discharging the batteries that do not exceed the prescribed voltage so as to maintain their voltage substantially constant, and thereby charging while balancing the battery voltages.

* * * * *